United States Patent Office 3,755,381
Patented Aug. 28, 1973

3,755,381
6,7 - DIHYDRO - 17 - HYDROXY-3-OXO-3'H-CYCLO-PROPA[6,7] - 17α - PREGNA - 4,6-DIENE-21-CAR-BOXYLIC ACIDS AND SALTS, AND PHARMACEUTICAL PREPARATIONS THEREOF
Leland J. Chinn, Morton Grove, and John W. Cusic, Skokie, Ill., assignors to G. D. Searle & Co., Chicago, Ill.
No Drawing. Continuation-in-part of abandoned application Ser. No. 47,914, June 19, 1970. This application Nov. 22, 1971, Ser. No. 201,163
Int. Cl. C07c 173/00
U.S. Cl. 260—397.1
3 Claims

ABSTRACT OF THE DISCLOSURE

Preparations of the captioned compounds and their unexpectedly potent and selective diuretic activity are disclosed.

---

The application for Letters Patent securing the invention herein described and claimed is a continuation-in-part of applicants' prior copending application Ser. No. 47,914 filed June 19, 1970, and now abandoned.

This invention relates to 6,7-dihydro - 17 - hydroxy-3 - oxo - 3'H - cyclopropa[6,7] - 17α - pregna - 4,6-diene-21-carboxylic acids and their salts, and to preparations thereof. More particularly, this invention provides new, useful, and unobvious chemical compounds of the formula

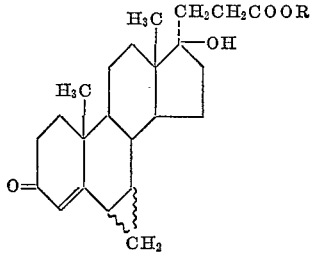

wherein R represents hydrogen, an alkali or alkaline earth metal, or the ammonium radical.

The compounds of this invention are useful by reason of their valuable pharmacological properties. Thus, for example, they are unexpectedly potent and selective diuretics remarkably adapted to reverse the effect of aldosterone on the renal electrolyte ratio without producing the progestational side-effect which characterizes superficially-related prior art.

The potent diuretic utility of the instant compounds is evident from the results of an assay for their capacity to reduce the sodium-retaining effect of d-aldosterone, thereby reversing the renal electrolyte ratio, in dogs. A group of 6 female mongrels weighing between 15 and 22 kg. is used in this assay, and compounds are tested at 2 dose levels in each animal, as also is a reference standard, spironolactone. Controls are provided by twice subjecting each animal to the test procedure without administering either compound or standard. Further controls are provided by likewise repeating the procedure without administering compound, standard, or aldosterone. The order in which the tests are carried out in the 6 test animals is randomized, and the tests are spaced at least 1 week apart to permit the animals to recover from the effect of the aldosterone previously administered. Spironolactone dosages are 2 and 8 mg./kg. (m.p.k.). Compound dosages are those which, on the basis of a preliminary assay in rats such as that described in U.S. Pat. 3,422,096 would be expected to produce responses roughly equivalent to those produced by the standard. In the event that any dose is insufficient to reduce the effect of the aldosterone, the assay is repeated at appropriately higher dose levels. The dogs are fed a regular diet at 4:00 p.m. on the day before each test and thereafter permitted tap water only (ad libitum) until the test is completed. Testing begins with the intramuscular injection in a hind limb of 0.2 ml. of sesame oil in which is dissolved 10 μg. of d-aldosterone if such is to be administered. The bladder is catheterized 30 minutes later and then rinsed with 40 ml. of distilled water, whereupon compound or standard, if either, is orally administered in a gelatin capsule and 10 ml./kg. of tap water is then immediately administered via stomach tube. Any urine excreted during the next 2½ hrs. is collected and combined with urine which, at the end of this time and following administration of 5 ml./kg. of water as before, is removed from the bladder by catheterization. Excreted urine, if any, is again collected for 2½ hrs. and combined with urine removed from the bladder by catheterization. The two urine speciments from each animal are analyzed for sodium and potassium; and the totals thereof are expressed as micro-equivalents per kg. Comparison of the mean log (Na×10/K) ratios±95% confidence limits determined from these totals serves as the index of anti-aldosterone potency in this assay. When potassium 6α,7α - dihydro - 17 - hydroxy - 3 - oxo-3'H-cyclopropa[6,7] - 17α - pregna - 4,6 - diene - 21 - carboxylate, the representative product of Example 1 hereinafter, and 6α,7α - dihydro - 17 - hydroxy - 3 - oxo-3'H-cyclopropa[6,7] - 17α - pregna - 4,6 - diene - 21 - carboxylic acid γ-lactone, the corresponding lactone disclosed in Belgian Pat. No. 730,163, were assayed by the foregoing procedure, the results were as shown in Table I.

TABLE I

| Compound | Dose aldosterone compound | | Mean log (Na×10/K) |
|---|---|---|---|
| | μg. | M.p.k. | |
| None (controls) | 0 | 0 | 1.272±0.105 |
| Do | 10 | 0 | 0.528±0.065 |
| Spironolactone | 10 | 2 | 0.900±0.160 |
| Do | 10 | 8 | 1.127±0.210 |
| Potassium 6α,7α-dihydro-17-hydroxy-3-oxo-3'H-cyclopropa[6,7]-17α-pregn-4,6-diene-21-carboxylate | 10 | 1 | 1.012±0.205 |
| Do | 10 | 4 | 1.248±0.170 |
| 6α,7α-dihydro-17-hydroxy-3-oxo-3'H-cyclopropa[6,7]-17α-pregn-4,6-diene-21-carboxylic acid γ-lactone | 10 | 1 | 0.827±0.195 |
| Do | 10 | 4 | 1.012±0.175 |

It follows from the tabulated data that the anti-aldosterone response to the product of Example 1 is 304% of that to spironolactone and 230% of that to the prior art lactone in the described assay, fiducial limits being 233–434% and 176–344%, respectively. Reversal of aldosterone effect was statistically significant for both compounds and standard ($P<0.05$ by paired $t$-test, using each dog as its own control).

Tests for progestational activity can be carried out as described by Clauberg in C. Zentr. Gynakol., 54, 2757 (1930), modified as follows: To each of a group of 3–4 immature, female rabbits weighing about 1 kg. and primed with 17β-estradiol by subcutaneously injecting 5 μg. thereof per animal on each of 6 successive days, test compound dissolved or suspended in corn oil is administered subcutaneously or bucally on each of 5 successive days beginning the next day after the last priming injection. Commonly, the initial daily dosage is 1 mg. of compound in 0.1 ml. of corn oil administered subcutaneously. Other animals likewise administered corn oil alone serve as controls. On the 6th day after the last priming injection, the animals are sacrificed; and a segment of each uterus is taken for histological examination whereby the degree of arborization of the endometrial glands is graded in accordance with a method similar to that described by McPhail in J. Physiol., 83, 145 (1934). A +1 percent represents the effect of estrogen priming alone and is indicated by the absence of glandular proliferation. A +2 response is induced in the estrogen-primed animals by approximately 0.05 mg. of progesterone administered subcutaneously, and is considered to represent minimal progestational activity. Responses in the range +3 to +4 reflect potent progestational effects typical of those produced by larger doses (~0.1 mg.) of subcutaneously administered progesterone. If the average rating for the test animals is less than +2 at the 1 mg. dose level, the compound is considered inactive. If the average rating at this dose is greater than +2, the test is repeated with compound administered in amounts decreased according to the progression 0.5, 0.2, 0.1, 0.05, 0.02, 0.01 . . . mg. until a dose insufficient to produce an average response of +2 can be determined. Potency of the compound in percent, relative to progesterone, is then calculated by dividing the next higher dose into 0.05 and multiplying by 100. Results of such tests on the product of Example 1 hereinafter, and the corresponding prior art lactone aforesaid, are set forth in Table II. Both compounds were administered subcutaneously in corn oil.

TABLE II

| Compound | Dose (mg.) | Animals (No.) | Response (average) |
| --- | --- | --- | --- |
| Potassium 6α,7α-dihydro-17-hydroxy-3-oxo-3'H-cyclopropa[6,7]-17α-pregna 4,6-diene-21-carboxylate | 1 | 4 | 1.5 |
| 6β,7β-dihydro-17-hydroxy-3-oxo-3'H-cyclopropa[6,7]-17α-pregna 4,6-diene-21-carboxylic acid γ-lactone | 1 | 4 | 2.8 |
| Do | 0.5 | 4 | 2.5 |
| Do | 0.2 | 4 | 2.0 |
| Do | 0.1 | 4 | 1.1 |

These data show that compounds of the instant invention represented by the product of Example 1 do not produce the progestational side-effect which characterizes administration of the corresponding lactone in the described assay, response to the latter compound being 25 percent of that to progesterone.

Those skilled in the art will recognize that observations of activity in standardized tests for particular biological effects are fundamental to the development of valuable new drug products, both veterinary and human.

The compounds of this invention can be administered in any convenient manner, including parenterally, albeit oral administration in the form of a tablet, capsule, solution, or suspension is preferred. Enteric coated tablets or capsules have the further advantage of delivering compound to the intestinal tract for optimum absorption in the duodenum and jejunum. Typical vehicles and/or excipients adapted to preparation of the foregoing dosage forms include water, ethanol, propylene glycol, corn oil, sesame oil, lactose, cellulose, calcium phosphate, dicalcium phosphate, tricalcium phosphate, sodium sulfate, calcium sulfate, corn starch, polyvinylpyrrolidone, acacia, methylcellulose, alkaline earth stearates such as magnesium stearate, and hydrogenated castor oil.

Biologically effective amounts of the instant compounds depend upon the purpose for which they are administered, the species involved, and individual response. Suggested daily dosages range from 0.2 to 4.0 mg./kg. orally.

The salts of this invention can be prepared by heating alcoholic solutions of 6,7-dihydro-17-hydroxy-3-oxo-3'H-cyclopropa[6,7]-17α-pregna-4,6-diene-21-carboxylic acid γ-lactones [Belg. 730,163] with appropriate bases, viz., lithium hydroxide, sodium hydroxide, potassium hydroxide, barium hydroxide, strontium hydroxide, calcium hydroxide, or the like. The acids of the invention can be prepared by precipitating aqueous solutions of the salts with excess hydrochloric acid. As an exception to the foregoing salt preparations, the ammonium salts hereof are prepared by prolonged contact of the acids hereof with saturated alcohol solutions of ammonia.

The following examples describe in detail compounds illustrative of the present invention and methods for their preparation. Throughout the examples hereinafter set forth, temperatures are given in degrees Centigrade and relative amounts of materials in parts by weight, except as otherwise noted.

EXAMPLE 1

Potassium 6α,7α-dihydro-17-hydroxy-3-oxo - 3'H - cyclopropa[6,7]-17α-pregna-4,6-diene-21-carboxylate To a mixture of 100 parts of 6α,7α-dihydro - 17 - hydroxy-3-oxo-3'H - cyclopropa[6,7]-17α-pregna-4,6-diene-21-carboxylic acid γ-lactone and 960 parts of 2-propanol is added a solution of 15 parts of potassium hydroxide in 100 parts of water. The resultant mixture is heated at the boiling point under reflux in a nitrogen atmosphere for 1 hour while solution occurs. Solvent is thereupon stripped by vacuum distillation, and the residue is cooled and slurried with ethyl acetate. The crystalline material isolated from the slurry by filtration is potassium 6α,7α-dihydro-17-hydroxy - 3 - oxo - 3'H - cyclopropa[6,7]-17α-pregna-4,6-diene-21-carboxylate which, dried in air, melts at 248–250° with decomposition. The product has the formula

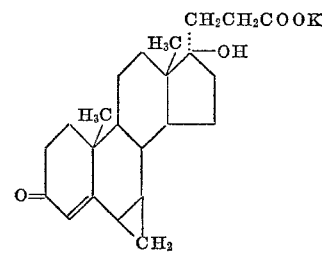

EXAMPLE 2

Potassium 6β,7β-dihydro-17-hydroxy-3-oxo-3'H-cyclopropa[6,7]-17α-pregna-4,6-diene-21-carboxylate Substitution of 100 parts of 6β,7β-dihydro-17-hydroxy-3-oxo-3'H-cyclopropa[6,7]-17α-pregna - 4,6 - diene - 21-carboxylic acid γ-lactone for the 6β,7β-epimer called for in Example 1 affords, by the procedure there detailed, potassium 6α,7α-dihydro-17-hydroxy-3-oxo - 3'H - cyclopropa[6,7]-17α-pregn - 4,6 - diene - 21 - carboxylate. The product has the formula

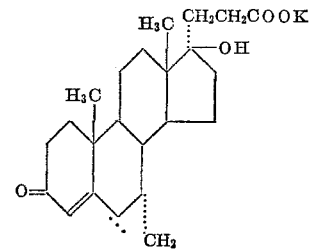

EXAMPLE 3

Sodium 6α,7α-dihydro-17-hydroxy-3-oxo-3'H-cyclopropa[6,7]-17α-pregna-4,6-diene-21-carboxylate To a mixture of 100 parts of 6α,7α-dihydro - 17 - hydroxy-3-oxo-3'H-cyclopropa[6,7]-17α-pregna - 4,6 - diene-21-carboxylic acid γ-lactone and 960 parts of 2-propanol is added a solution of 11 parts of sodium hydroxide in 100 parts of water. The resultant mixture is heated at the boiling point under reflux in a nitrogen atmosphere for 1 hour, whereupon solvent is stripped by vacuum distillation. The residue is cooled and slurried with ethyl acetate. The insoluble crystalline product isolated from the slurry by filtration is sodium 6α,7α-dihydro-17-hydroxy-3-oxo-3'H - cyclopropa[6,7]-17α-pregna - 4,6 - diene-21-carboxylate.

EXAMPLE 4

Calcium 6α,7α-dihydro-17-hydroxy-3-oxo-3'H-cyclopropa[6,7]-17α-pregna-4,6-diene-21-carboxylate A mixture of 10 parts of 6α,7α-dihydro-3-oxo-3'H-cyclopropa[6,7]-17α-pregna-4,6-diene - 21 - carboxylic acid γ-lactone, 2 parts of calcium hydroxide, and 400 parts of 2-propanol is stirred and heated at the boiling point under reflux in a nitrogen atmosphere for 4 hours. The resultant mixture is stripped of solvent by vacuum distillation, and the residue is slurried with ethyl acetate. The slurry is filtered. The crystalline product thus isolated is calcium 6α,7α-dihydro-17-hydroxy-3-oxo-3'H-cyclopropa[6,7]-17α-pregna-4,6-diene-21-carboxylate.

EXAMPLE 5

6α,7α-dihydro-17-hydroxy-3-oxo-3'H-cyclopropa-[6,7]-17α-pregna-4,6-diene-21-carboxylic acid To a solution of 10 parts of potassium 6α,7α-dihydro-17-hydroxy-3-oxo - 3'H - cyclopropa[6,7] - 17α - pregna-4,6-diene-21-carboxylate in 1000 parts of water is added 18 parts of 5% hydrochloric acid. The colorless precipitate thrown down is filtered off, washed with water, and dried in air. The product thus isolated is 6α,7α-dihydro-17-hydroxy-3-oxo - 3'H - cyclopropa[6,7] - 17α - pregna-4,6-diene-21-carboxylic acid.

EXAMPLE 6

Ammonium 6α,7α-dihydro-17-hydroxy-3-oxo-3'H-cyclopropa[6,7]-17α-pregna-4,6-diene-21-carboxylate To 20 parts of 2-propanol saturated with ammonia is added 1 part of 6α,7α-dihydro-17-hydroxy - 3 - oxo-3'H-cyclopropa[6,7]-17α-pregna-4,6-diene-21-carboxylic acid. The resultant mixture is allowed to stand at room temperatures for 24 hours at which point solvent is removed by vacuum distillation. The residue is washed with ethyl acetate and dried in air. The product thus isolated is ammonium 6α,7α - dihydro-17-hydroxy-3-oxo-3'H-cyclopropa[6,7]-17α-pregna-4,6-diene-21-carboxylate.

EXAMPLE 7

Potassium 6α,7α-dihydro-17-hydroxy-3-oxo - 3'H - cyclopropa[6,7]-17α-pregna-4,6-diene - 21 - carboxylate uncoated tablets A mixture of 125 parts of potassium 6α,7α-dihydro-17-hydroxy-3-oxo - 3'H - cyclopropa[6,7] - 17α - pregna-4,6-diene-21-carboxylate, 1815 parts of calcium sulfate dihydrate, 532 parts of corn starch, and 90 parts of polyvinylpyrrolidone is screened, remixed, and then moistened with water. The resultant mixture is screened, remixed again, and granulated with cold water, then screened again, dried, and finally screened once more. Approximately 13 parts of magnesium stearate is thereupon introduced, and the mixture thus obtained is thoroughly blended, assayed, and compressed into 10-mg. tablets.

EXAMPLE 8

Potassium 6α,7α-dihydro-17-hydroxy-3-oxo - 3'H - cyclopropa[6,7] - 17α - pregna - 4,6 - diene-21-carboxylate enteric-coated tablets A mixture of 384 parts of cellulose acetate phthalate and 96 parts of diethyl phthalate is dissolved in a mixture of 10,720 parts of dichloromethane and 1280 parts of absolute ethanol. The resultant solution is applied to 10-mg. uncoated tablets of potassium 6α,7α-dihydro-17-hydroxy-3-oxo-3'H-cyclopropa[6,7]-17α-pregna - 4,6 - diene-21-carboxylate rotating in a coating pan by intermittent spraying q.s. the desired coating thickness.

What is claimed is:

1. A compound of the formula

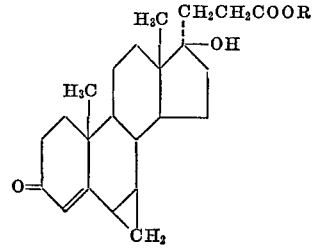

wherein R represents hydrogen, an alkali or alkaline earth metal, or the ammonium radical.

2. A compound according to claim 1 having the formula

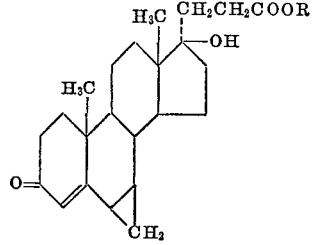

wherein R represents an alkali metal.

3. A compound according to claim 1 which is potassium 6α,7α - dihydro-17-hydroxy-3-oxo-3'H-cyclopropa-[6,5]-17α-pregna-4,6-diene-21-carboxylate.

No references cited.

ELBERT L. ROBERTS, Primary Examiner

U.S. Cl. X.R.

260—239.57; 424—238

UNITED STATES PATENT OFFICE
CERTIFICATE OF CORRECTION

Patent No. 3,755,381     Dated August 28, 1973

Inventor(s) Leland J. Chinn and John W. Cusic

It is certified that error appears in the above-identified patent and that said Letters Patent are hereby corrected as shown below:

Column 2, line 19, "speciments" should be -- specimens --.

Column 3, line 2, "percent rep-" should be -- percent response rep- --.

Column 3, line 31, "6β,7β-" should be -- 6α,7α- --.

Column 4, line 45, "6α,7α-" should be -- 6β,7β- --.

Column 6, line 47, "[6,5]- should be -- [6,7]- --.

Signed and sealed this 23rd day of April 1974.

(SEAL)
Attest:

EDWARD M.FLETCHER,JR.
Attesting Officer

C. MARSHALL DANN
Commissioner of Patents